United States Patent

Hotate et al.

[11] Patent Number: 5,448,418
[45] Date of Patent: Sep. 5, 1995

[54] MIRROR FOR SOR

[75] Inventors: Shirou Hotate, Yokohama; Hiraku Yamazaki, Chiba; Teruo Sugai; Shigeo Kato, both of Yamagata; Haruo Tazoe, Sagamihara; Hiroaki Koike, Niigata; Takeshi Inaba; Eiichi Toya, both of Yamagata; Shinichi Inoue, Niigata, all of Japan

[73] Assignee: Toshiba Ceramics Co., Ltd., Tokyo, Japan

[21] Appl. No.: 29,648

[22] Filed: Mar. 10, 1993

[51] Int. Cl.$^6$ ................................. G02B 5/08
[52] U.S. Cl. .................... 359/883; 359/584; 378/70; 427/10; 427/167; 427/589; 427/249; 427/255; 427/255.7; 428/213; 428/216; 428/448; 428/912.2
[58] Field of Search ............. 359/838, 848, 883, 359, 359/584, 585; 378/70, 84; 427/10, 166, 167, 585, 588, 589, 249, 255, 255.7; 428/213, 215, 216, 448, 912.2

[56] References Cited

U.S. PATENT DOCUMENTS

| | | | |
|---|---|---|---|
| 4,142,006 | 2/1979 | Choyke et al. | 427/162 |
| 4,684,565 | 11/1984 | Abeles | 428/220 |
| 4,856,887 | 8/1989 | Wakugawa et al. | 359/883 |
| 5,106,687 | 4/1992 | Tanino et al. | 428/141 |
| 5,149,338 | 9/1992 | Fulton | 51/293 |
| 5,182,763 | 1/1993 | Iizuka et al. | 378/145 |

OTHER PUBLICATIONS

Patent Abstracts of Japan, vol. 16, No. 451, Sep. 18, 1992, P-1424.
Patent Abstracts of Japan, vol. 14, No. 129, No. 129, Mar. 12, 1990, P-1020.
"Laser and Optoelektkronik", No. 2, 1988, p. 19.

Primary Examiner—Ricky D. Shafer
Attorney, Agent, or Firm—Foley & Lardner

[57] ABSTRACT

A mirror for SOR includes a base (1) made of a heat resistant ceramic material having a surface, a first SiC coating (2, 3) formed on the surface of the base (1), which has a first smoothed surface, and a second SiC coating (4, 5) formed on the first smoothed surface of the first SiC coating (2, 3), which has a second smoothed surface. A third SiC coating can be formed on the smoothed surface of the second SiC coating (4).

3 Claims, 2 Drawing Sheets

MIRROR FOR SOR

BACKGROUND OF THE INVENTION

This invention relates to a mirror for SOR (synchrotron optical radiation or synchrotron radiation light).

A conventional mirror for SOR comprises a base made of a heat resistant ceramic material such as graphite or SiC and a SiC coating formed on a surface of the base by a CVD (chemical vapor deposition) method for a long period of time or at plural times, which has a predetermined thickness of several hundreds microns. The surface of the SiC coating is mirror-polished so as to become a reflection surface for SOR.

In recent years, mirrors have various increased sizes and complicated surfaces to be polished, so that the thickness of such SiC coatings must increase in order to have a desired margin for the machining purpose or the like.

However, if the thickness of the SiC coating of the mirror for SOR increases, crystal particles grow in an irregular manner in various directions. As a result, defects due to occlusion of particles or grain boundary defects resulting from irregular grain growth take place so that reflectance decreases.

SUMMARY OF THE INVENTION

The object of this invention is to provide a mirror for SOR which has an improved reflectance.

According to this invention, a mirror for SOR comprises a base made of a heat resistant ceramic material having a surface, a first SiC coating formed on the surface of the base, which has a first surface, and a second SiC coating formed on the first surface of the first SiC coating, which has a second smoothed surface. The first surface of the first SiC coating is a smoothed surface such as a polished or lapped surface.

The first and second SiC coatings are preferably formed by a CVD method. If there are only two coatings, then the first coating is an intermediate coating while the second coating is an outermost coating. If there are three SiC coatings or more, then both of the first and second coatings are intermediate coatings.

The first or intermediate smoothed surface has a predetermined surface roughness of RMS (Root Mean Square Average) 10 angstroms to RMS 5,000 angstroms. A preferred example of the first smoothed surface is a polished surface or a lapped surface.

The second or outermost smoothed surface has a predetermined surface roughness of RMS (Root Mean Square Average) 3 angstroms to RMS 10 angstroms. An example of the outermost smoothed surface is a mirror-polished surface.

According to the present invention, it is important that the surface of the intermediate coating or coatings is smoothed and then the next coating is formed on the smoothed surface of the intermediate coating.

Even if a second SiC coating having a second smoothed surface is formed on the first surface of the first SiC coating, in case the first surface of the first SiC coating is not smoothed, it cannot be effectively avoided that the second SiC coating grows in an irregular manner. If the intermediate SiC coating is not smoothed, the next or outermost SiC coating may grow in an irregular manner whereby some defects take place at grain boundaries near non-smoothed surface of the intermediate coating on which the next coating is formed. It badly affects the reflectance. The first smoothed surface of the first SiC coating may function so as to avoid the irregular grain growth or anisotropy of the second SiC coating. According to the present invention, therefore, even if the total thickness of the first and second SiC coatings increases, any defects can be effectively avoided.

Each thickness of plural SiC coatings such as the first and second SiC coatings preferably has 30 microns to 300 microns. If it is less than 30 microns, the first SiC coating sometimes do not perfectly or completely cover the surface of the base so that it is partly exposed. In particular, some portion of the base surface is exposed when it is polished. If each thickness of the first and second SiC coatings is more than 300 microns, the irregular grain growth or anisotropy cannot be properly avoided in some conditions. Thus, after the outermost coating is polished, defects such as chipping occur at grain boundaries.

PREFERRED EMBODIMENTS OF THE INVENTION

Figure 1:
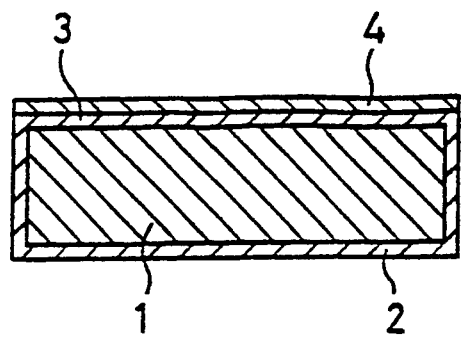
FIG. 1 is a schematic cross-sectional view showing a mirror for SOR according to an embodiment of this invention.
Figure 2:
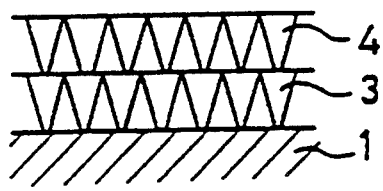
FIG. 2 shows a conceptual cross-section of an essential portion of the mirror for SOR according to the embodiment of FIG. 1.

A mirror for SOR (synchrotron optical radiation or synchrotron radiation light) includes a base 1 made of SiC in the shape of a rectangular plate having a size of 100 mm×300 mm×20 mm, and a first SiC coating 2 formed on the whole surface of each side of the base 1 by a CVD method as shown in FIG. 1 so as to have a thickness of 30 microns to 300 microns when it is polished. Only one surface portion, for example, an upper surface portion 3 of the first SiC coating 2 functioning as a reflection side is polished so as to have a surface roughness of RMS 10 angstroms to 5,000 angstroms. A second SiC coating 4 is formed on the polished surface portion 3 of the first SiC coating 2 by a CVD method so as to have a thickness of 30 microns to 300 microns when the second SiC coating 4 is polished. The second coating 4 is also polished until its reflection surface has a surface roughness of RMS 3 angstroms to RMS 10 angstroms. Thus, a two-layer structure of the first and second SiC coatings 3, 4 is formed on the surface of the base 1 at the reflection side of the mirror.

The surface roughness of the first SiC coating 3 is preferably from RMS 10 angstroms to RMS 5,000 angstroms. If it is less than RMS 10 angstroms, production costs are high. If it is more than RMS 5,000 angstroms, the surface roughness of the first SiC coating 3 affects the crystal form of the second SiC coating 4 such that some defects such as irregularly grown crystal particles take place on the reflection surface of the mirror.

In order that the second SiC coating 4 has a reflection surface functioning as a mirror, it is mirror-polished so as to have a surface roughness of RMS 3 angstroms to RMS 10 angstroms.

Figure 3:
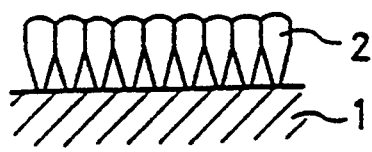
FIGS. 3 to 6 are explanation views showing steps in series of producing the mirror for SOR according to the embodiment of FIG. 2.

A mirror for SOR according to this invention may be produced as follows:

Many rectangular SiC plates are prepared, each of which is shaped as the base 1 so as to have the above-stated size. The bases 1 are cleaned by HCl gas at a temperature of 1,250° C. After that, as shown in FIG. 3, first SiC coatings 2 are formed on the bases 1, respectively. The first SiC coatings 2 have various thicknesses by changing the treatment time by a CVD method in which three gases are supplied in a mixed condition at their respective flow rates at a predetermined temperature as follows:

Gas:
 SiCl₄ 0.24 l/min
 CH₄ 0.24 l/min
 H₂ 0.70 l/min
Temperature:
 1,400° C.

The first SiC coatings 2 are formed on the whole surface of all sides of the bases 1.

Figure 4:
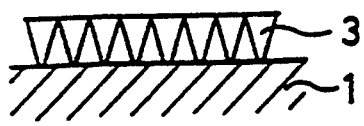

Next, each upper surface portion of the first SiC coatings 2 functioning as a reflection side is smoothed by lapping or polishing so that the polished or lapped surface of the SiC coating 3 has a surface roughness of RMS 10 angstroms as shown in FIG. 4.

Figure 7:
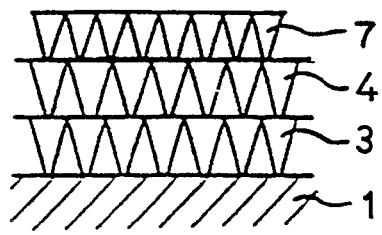
FIG. 7 is a schematic cross-sectional view showing a mirror for SOR according to a further embodiment of the invention.

Table 1 shows the CVD coating thickness and the number of observed defects of six samples. In Samples No. 1 to No. 5, a single SiC coating 2 is formed on the surface of the base 1. In Sample No. 6, three layers 3, 4 and 7 of SiC coatings 2 are formed on the surface of the base 1 so as to have a total thickness of 300 microns, each of which has a polished surface and a thickness of 100 microns as shown in FIG. 7. The number of defects is decided by counting the defects having a length of 10 microns or more when the measured surface is lightened by a halogen lamp and observed through a reflection type stereo-microscope.

As can be seen from Table 1, Samples No. 2 to No. 4 and No. 6 in which the CVD coatings have a thickness of 30 microns to 300 microns are better than Sample No. 1 with regard to the observed defects. In particular, Sample No. 6 shows that the number of defects can be decreased if the coating consists of plural layers although the total thickness of it is the same as that of the single layer coating.

Other examples will be explained below.

Bases 1 are cleaned by HCl gas at a temperature of 1,250° C. After that, as shown in FIG. 3, first SiC coatings 2 are formed on the bases 1, respectively, by the above-stated CVD method. The first SiC coatings 2 have the same thickness of 100 microns.

As shown in FIG. 4, the surfaces of the first SiC coatings 2 are mechanically treated by milling, lapping, polishing and others so that the surface portions 3 thereof have various surface roughnesses depending on treatment types. After that, as shown in FIG. 5, a second SiC coating 5 having a thickness of 130 microns is formed on each of the surface portions 3 by a CVD method in which two gases are supplied in a mixed condition at their respective flow rates at a predetermined temperature as follows:

Gas:
 MTCS (trimethylchrolosila$_n$e) 0.24 l/min
 H₂ 0.70 l/min
Temperature:
 1,300° C.

Figure 5:
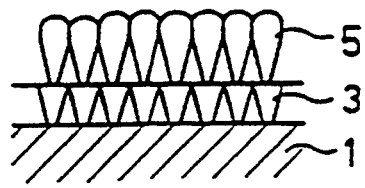

As shown in FIG. 5, the second SiC coatings 5 are formed on the surface portions 3, respectively.

Figure 6:
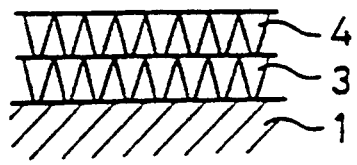

Next, each surface of the second SiC coatings 5 is smoothed by lapping, polishing or the like so that the smoothed surface of the SiC coating 5 becomes a mirror-polished surface portion 4 as shown in FIG. 6. In this condition, the second SiC coatings 5 have a thickness of 100 microns.

After that, the base 1 and the two coatings are together cleaned by HCl gas at a temperature of 1,250° C. whereby a mirror for SOR can be obtained.

Table 2 shows the surface roughness of the first polished surface of each example and the number of defects having a length of 10 microns or more observed on the smoothed surface of the SiC coatings 4.

As can be seen from Table 2, it is preferable that the first SiC coating 3 which is an intermediate coating has a surface roughness of RMS 5,000 angstroms or less as in Examples No. 1 to No. 4.

Table 3 shows the relationship between the number of defects on the surface of each mirror for SOR and the X-ray reflectance.

As can be seen from Table 3, the number of defects observed on the reflection surface of the mirror can be limited to 0.3/cm² or less if the thickness of each SiC coatings is from 30 microns to 300 microns and the surface roughness of the intermediate SiC coating is from RMS 10 angstroms to RMS 5,000 angstroms. In such a case, the mirror for SOR can have a X-ray reflectance of 93% to 95% which is remarkably improved in comparison with the prior art mirror for SOR having a X-ray reflectance of 85% or less.

Although in the above-stated embodiments the first and second SiC coatings 2, 5 are formed in the different conditions by the CVD method, the two coatings can be formed in the same conditions. The base 1 can be made of not only SiC but also graphite, SiC impregnated with Si, single Si crystal or any other material. The coatings formed on the base can consist of three or more layers if no peeling problem take place between the base and the SiC coatings.

For example, in case the total thickness of plural SiC coatings is 500 microns and a CVD method is carried out at a temperature of 1,500° C. or more so as to form such SiC coatings, the crystal form of the SiC coatings is apt to become relatively large. For such reasons, the number of coating layers is preferably three or four, or even more. On the other hand, in case the total thickness of plural SiC coatings is 500 microns and a CVD method is carried out at a temperature of 1,100° C. to 1,500° C. more so as to form such SiC coatings, the number of coating layers is preferably two because any increasd number of coating layers does not effectively decrease the number of defects on the surface of the mirror.

TABLE 1

| | Sample No. | | | | | |
|---|---|---|---|---|---|---|
| | 1 | 2 | 3 | 4 | 5 | 6 |
| CVD coating thickness (microns) | 10 | 30 | 100 | 300 | 500 | 300 |
| number of defects/cm² | 1.0 | 0.1 or less | 0.1 or less | 0.3 | 0.6 | 0.1 or less |

TABLE 2

| | Sample No. | | | | |
|---|---|---|---|---|---|
| | 1 | 2 | 3 | 4 | 5 |
| Surface rough- | 10 | 100 | 1000 | 5000 | 10000 |

TABLE 2-continued

| | Sample No. | | | | |
|---|---|---|---|---|---|
| | 1 | 2 | 3 | 4 | 5 |
| ness of smoothed SiC coating 3 (angstrom) | | | | | |
| Number of defects on smoothed SiC coating 4/cm² | 0.1 or less | 0.1 or less | 0.1 or less | 0.3 | 0.6 |

Notes: Each SiC coating has a thickness of 100 microns.

TABLE 3

| Number of defects/cm² | 0.1 or less | 0.3 | 0.6 | 0.8 | 1.0 |
|---|---|---|---|---|---|
| Reflectance (%) | 95 | 93 | 85 | 75 | 63 |

What is claimed is:

1. A mirror for synchrotron optical radiation (SOR), comprising:
    a base made of a heat resistant ceramic material having a surface,
    a first intermediate SiC coating deposited by chemical vapor deposition (CVD) and formed on the surface of the base, wherein a first surface of the first intermediate SiC coating has a first smoothed surface, and
    a second SiC coating deposited by CVD and formed on the first smoothed surface of the first intermediate SiC coating, said second SiC coating having a second smoothed surface, wherein the first smoothed surface of the first intermediate SiC coating has a predetermined surface roughness of about 10 to about 5,000 angstroms RMS (Root Mean Square) and the second SiC coating has a polished reflection surface with a predetermined surface roughness of about 3 to about 10 angstroms RMS, wherein each of the first and second SiC coatings have a thickness of about 30 microns to about 300 microns.

2. A mirror for synchrotron optical radiation (SOR), comprising:
    a base made of a heat resistant ceramic material having a surface,
    a first intermediate SiC coating deposited by chemical vapor deposition (CVD) and formed on the surface of the base, wherein a first surface of the first intermediate SiC coating has a first smoothed surface, and
    a second SiC coating deposited by CVD and formed on the first smoothed surface of the first intermediate SiC coating, said second SiC coating having a second smoothed surface, wherein the first smoothed surface of the first intermediate SiC coating has a predetermined surface roughness of about 10 to about 5,000 angstroms RMS (Root Mean Square) and the second SiC coating has a polished reflection surface with a predetermined surface roughness of about 3 to about 10 angstroms RMS, wherein the thickness of the first and second SiC coatings ranges from about 30 microns to about 300 microns.

3. A mirror for synchrotron optical radiation (SOR) comprising:
    a base made of a heat resistant ceramic material having a surface,
    an outermost chemical vapor deposition (CVD) SiC coating with a polished reflection surface having a predetermined surface roughness of 3 angstroms RMS (Root Mean Square Average) to 10 angstroms RMS and at least one intermediate CVD SiC coating provided between the outermost CVD SiC coating and the base, the intermediate CVD SiC coating having a smoothed surface at the side of the outermost CVD SiC coating, the smoothed surface of the intermediate CVD SiC coating having a predetermined surface roughness of 10 angstroms RMS to 5,000 angstroms RMS, wherein the intermediate CVD SiC coating has a thickness of 30 microns to 300 microns.

* * * * *